(12) United States Patent
Chen et al.

(10) Patent No.: US 9,093,002 B2
(45) Date of Patent: Jul. 28, 2015

(54) DIRECT TYPE BACKLIGHT MODULE AND DISPLAY DEVICE INCLUDING SAME

(71) Applicant: AU OPTRONICS CORP., Hsin-Chu (TW)

(72) Inventors: Yi-Yu Chen, Hsin-Chu (TW); Hung-Lung Hsu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 235 days.

(21) Appl. No.: 13/680,159

(22) Filed: Nov. 19, 2012

(65) Prior Publication Data

US 2013/0170187 A1 Jul. 4, 2013

(30) Foreign Application Priority Data

Dec. 30, 2011 (TW) .............................. 100150023 A

(51) Int. Cl.
G09F 13/04 (2006.01)
G09F 13/08 (2006.01)
G09F 13/10 (2006.01)
G02F 1/1333 (2006.01)
(Continued)

(52) U.S. Cl.
CPC .......... *G09F 13/04* (2013.01); *G02F 1/133605* (2013.01); *G02F 1/133608* (2013.01); *G02B 6/0031* (2013.01); *G02F 2001/133317* (2013.01); *G09F 2013/145* (2013.01)

(58) Field of Classification Search
CPC ................. G02F 1/133308; G02F 1/133605; G02F 1/133608; G02F 2201/503; G02F 2001/133317; G02B 6/0031

USPC ............ 362/632–634, 97.1–97.4; 349/58, 60, 349/62, 63, 67
See application file for complete search history.

(56) References Cited

U.S. PATENT DOCUMENTS 5,990,989 A * 11/1999 Ozawa ............................ 349/61
7,626,654 B2 * 12/2009 Tsubokura et al. ............. 349/60
(Continued)

FOREIGN PATENT DOCUMENTS

CN          1837915 A      9/2006
JP        2008-288118     11/2008
(Continued)

OTHER PUBLICATIONS

China Patent Office, Office Action issued on May 30, 2013.

*Primary Examiner* — Robert May
*Assistant Examiner* — Alexander Garlen
(74) *Attorney, Agent, or Firm* — WPAT, PC; Justin King

(57) ABSTRACT

A direct type backlight module includes a bezel, a light source, a reflecting plate and least one buffering liner plate. The bezel includes a bottom plate and a plurality of sidewalls connected to the bottom plate, and defines a receiving space therein. Each of the sidewalls includes a connecting portion and an extending portion. One end of the connecting portion is connected to the bottom plate, and the extending portion extends from another end of the connecting portion. The light source and the reflecting plate are disposed within the receiving space. The reflecting plate includes a stopping portion and a reflecting potion disposed between the light source and the bezel. The stopping portion extends outwardly from the reflecting portion and is fixed on the corresponding extending portion. The buffering liner plate is disposed on at least one of the extending portion and adjoins to an edge of the stopping portion.

14 Claims, 7 Drawing Sheets

(51) Int. Cl.
*G02F 1/1335* (2006.01)
*F21V 8/00* (2006.01)
*G09F 13/14* (2006.01)

(56) References Cited

U.S. PATENT DOCUMENTS

| | | | |
|---|---|---|---|
| 7,819,574 B2 * | 10/2010 | Yoo et al. | 362/633 |
| 2006/0198131 A1 | 9/2006 | Lai | |
| 2007/0229726 A1 * | 10/2007 | Azuma et al. | 349/58 |
| 2008/0030653 A1 * | 2/2008 | Lee et al. | 349/67 |
| 2010/0014015 A1 * | 1/2010 | Ho et al. | 349/58 |
| 2010/0103697 A1 * | 4/2010 | Shimojoh | 362/609 |
| 2010/0302457 A1 * | 12/2010 | Yamamoto et al. | 348/725 |
| 2010/0309106 A1 * | 12/2010 | Kuromizu | 345/87 |
| 2010/0309408 A1 * | 12/2010 | Fukuda | 349/62 |

FOREIGN PATENT DOCUMENTS

| | | |
|---|---|---|
| JP | 2009-175376 | 8/2009 |
| TW | 200426464 | 10/2006 |
| TW | I303737 | 12/2008 |

* cited by examiner

DIRECT TYPE BACKLIGHT MODULE AND DISPLAY DEVICE INCLUDING SAME

TECHNICAL FIELD

The present invention relates to a backlight module, and more particularly to a direct type backlight module and a display device including the same.

BACKGROUND

Recently, as the development of green and environment-friendly industry, liquid crystal displays having advantages of high resolution, low volume, low energy consumption and low radiation become the most popular display devices in the market.

A liquid crystal display device mainly includes a liquid crystal display panel and a backlight module. The backlight module provides the light for the liquid crystal display panel and the liquid crystal display panel utilizing the light to display. Generally, backlight module can be classified into direct type and side type. Compare with side type, direct type backlight module can provide higher brightness. Thus, direct type backlight module is usually used if the brightness is the most important concern.

During an assembling process of a direct type backlight module, positioning precision of parts significantly affects the quality of obtained backlight module. Thus, how to improve the assembling precision of direct type backlight modules is a major agenda for the developers and researchers in this art.

SUMMARY OF EMBODIMENTS

An embodiment of the present disclosure provides a direct type backlight module, which includes a bezel, a light source, a reflecting plate and least one buffering liner plate. The bezel includes a bottom plate and a plurality of sidewalls connected to the bottom plate. The sidewalls and the bottom plate cooperatively define a receiving space therein. Each of the sidewalls includes a connecting portion and an extending portion. One end of the connecting portion is connected to the bottom plate, and the extending portion extends from another end of the connecting portion. The light source and the reflecting plate are disposed within the receiving space. The reflecting plate includes a stopping portion and a reflecting potion. The reflecting portion is disposed between the light source and the bezel. Each stopping portion extends outwardly from the reflecting portion and is fixed on the extending portion. The buffering liner plate is disposed on the extending portion and adjoins to an edge of the stopping portion.

Another embodiment of the present disclosure provides a display device, which includes the above direct type backlight module and a display panel spanning across over the receiving space and supported by the buffering liner plate.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

Figure 1:
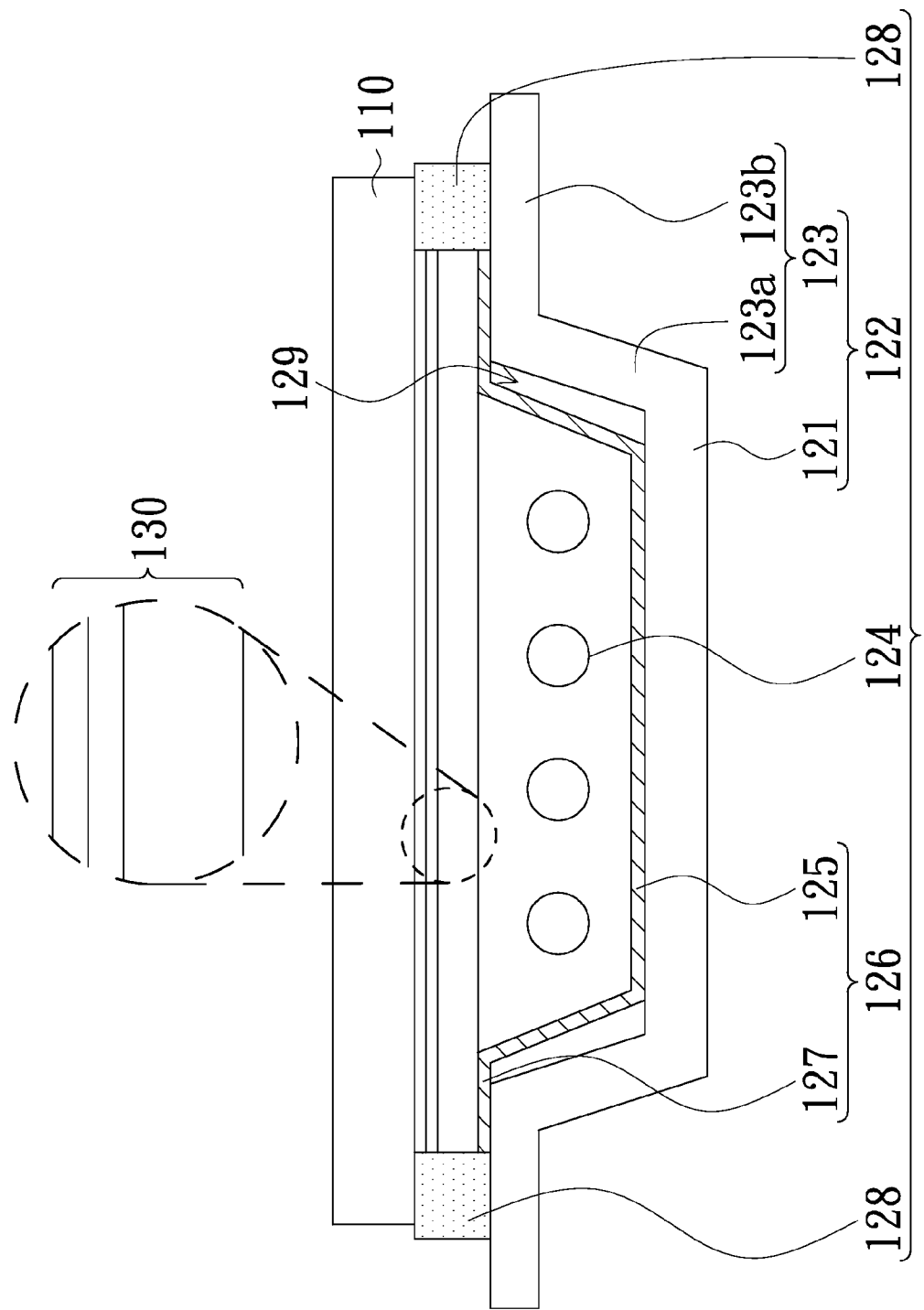
FIG. 1 is a cross sectional schematic view of a display device in accordance with a first embodiment.

FIG. 1 is a cross sectional view showing a display device in accordance with an embodiment. Referring to FIG. 1, a display device 100 includes a display panel 110 and a direct type backlight module 120. The direct type backlight module 120 includes a bezel 122, a light source 124, a reflective plate 126 and a buffering liner plate 128. The bezel 122 includes a bottom plate 121 and a plurality of sidewalls 123. The sidewalls 123 are connected to the bottom plate, and the sidewalls 123, the bottom plate 122 cooperatively defines a receiving space 129 therein. In addition, each of the sidewalls 123 includes a connecting portion 123a and an extending portion 123b. An end of the connecting portion 123a is connected to the bottom plate 121, and the extending portion 123b extends and bends from another opposite end of the connecting portion 123a. In the present embodiment, the bezel 122, for example, includes two opposite sidewalls 123. However, the number of the sidewalls 123 is not limited. For example, the bezel 122 can also include four sidewalls of two opposite pairs.

The light source 123 and the reflective plate 126 are disposed within the receiving space 129 surrounded by the bottom plate 121 and the sidewalls 123. In the present embodiment, the light source 124, for example, includes several cold cathode fluorescent lamps (CCFL). However, in other embodiments, the light source 124 can also be replaced with light emitting diodes. The reflective plate 126 includes a reflecting portion 125 and a stopping portion 127, and the reflecting portion 125 is between the light source 124 and the bottom plate 121 of the bezel 122. The stopping portion 127 extends from the reflecting portion 125 and is fixed on the extending portion 123b of the sidewalls 123. The reflecting portion 125, for example, can be stuck onto the bottom plate 121 with double-sided tape or other glues (not show). The buffering liner plate 128 is disposed on the extending portion 123b of the sidewalls 123, and is adjacent to the stopping portion 127 of the reflecting plate 126. That is, the buffering liner plate 128 is adjacent to and touches the edge of the stopping portion 127. In other words, the buffering liner plate 128 is positioned on the extending portion 123b by the stopping portion 127 of the reflecting plate 126. In addition, the buffering liner plate 128, for example, can be stuck onto the extending portion 123b with double-sided tape or other glues (not shown).

The display panel 110 spans across over the receiving space 129, and is disposed on the buffering liner plate 128. The display panel 110 of the present embodiment, for example, is a liquid crystal display (LCD) panel or other non-self-luminous display panels. The buffering liner plate 128 can be used to receive the impact when the display panel 110 endures an external force, and thereby prevents the display panel 110 from striking the extending portion 123b of the bezel 122. In the present embodiment, the buffering liner plate 128, for example, consists of rubber or other elastic materials.

Additionally, the direct type backlight module 120 may further includes at least one optical film 130 disposed above the receiving space 129 and between the light source 124 and the display panel 110. For example, the optical film 130 may be a diffusing sheet, a brightness enhancement film (BEF), a prism sheet, or combination thereof. The optical film 130 is used to improve the display quality of display devices.

As described above, the relative position of the display panel 110 and the direct type backlight module 120 is determined by the buffering liner plate 128, and the position of the buffering liner plate 128 on the extending portion 123b is determined by the stopping portion 127 of the reflecting plate 126. Therefore, if the reflecting plate 126 is well aligned and assembled onto the bezel 122, the buffering liner plate 128 is precisely positioned relative to the extending portion 123b. Accordingly, the display panel 110 is positioned relative to the backlight module 120. It is to be noted that the assembling and positioning of the reflecting plate 126 and the bezel 122 can be achieved by their matching profile and the process is simple and time-saving. One of ordinarily skilled in the art would know the detail process of assembling the reflecting plate 126 onto the bezel 122, and is not described here in detail for concise consideration.

In the known art, a frame (not shown) is usually disposed on the bezel 122, and the buffering liner plate 128 can be nested in a groove formed in the frame. In the present embodiment, the buffering liner plate 128 is directly disposed on the extending portion 123b of the bezel 122, and is well positioned through the stopping portion 127 of the reflecting plate 126, and thus it is not necessary to dispose the frame on the bezel 122. Therefore, compared with the known ones, the direct type backlight module 120 of the present embodiment not only has accurate assembling precision, but also has smaller volume.

Figure 2:
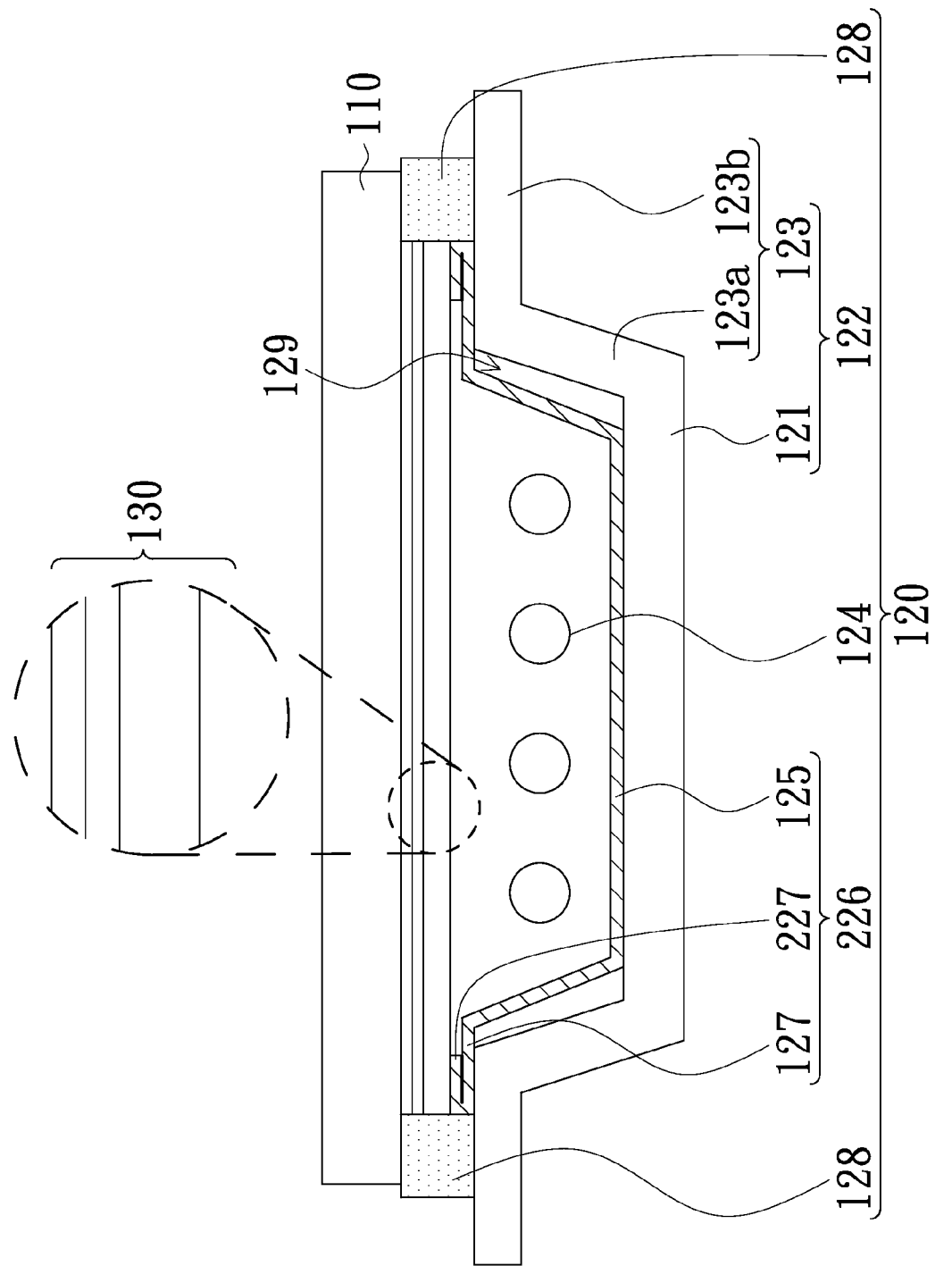
FIG. 2 is a cross sectional schematic view of a display device in accordance with a second embodiment.
Figure 3:
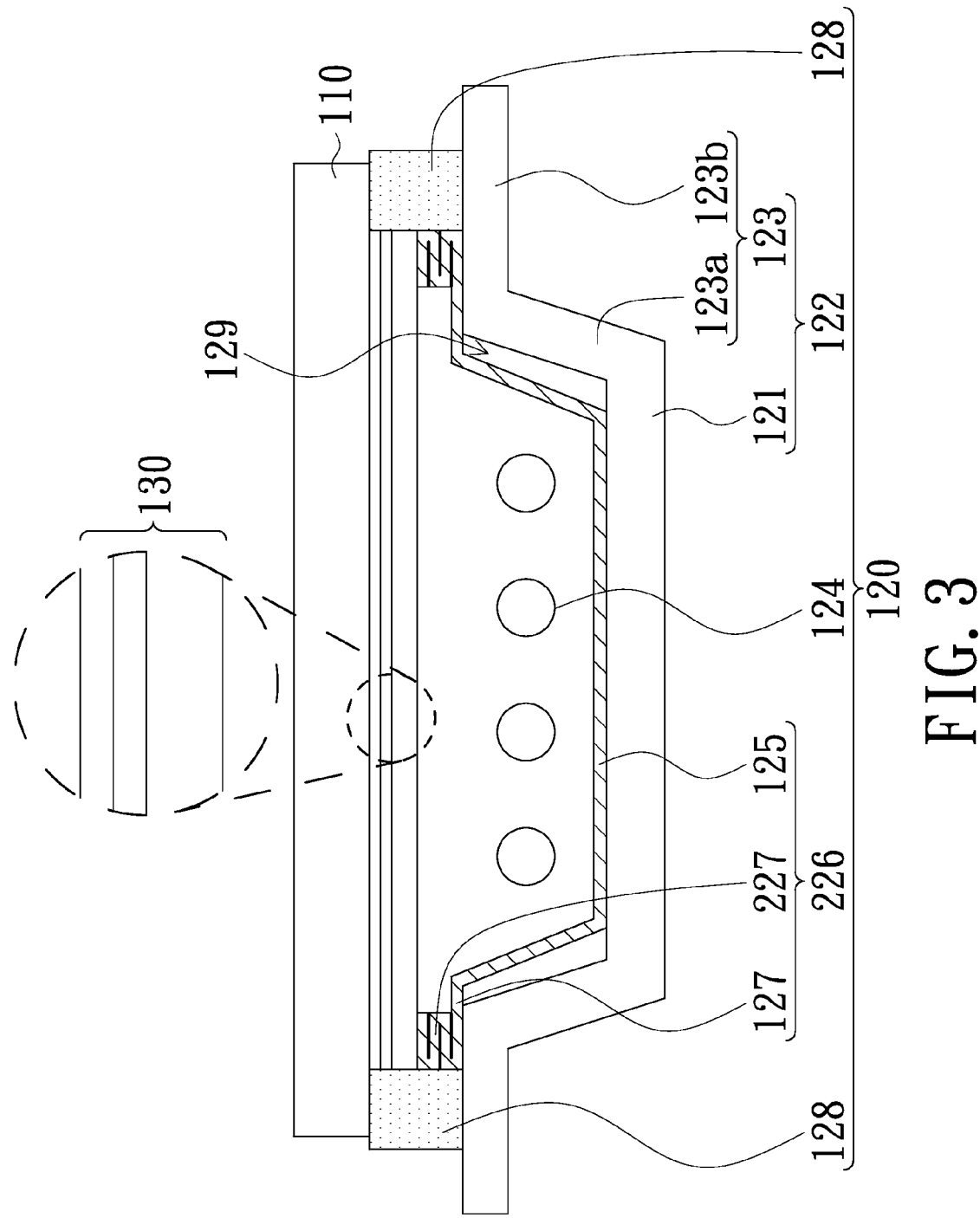
FIG. 3 is a cross sectional schematic view of a display device in accordance with a third embodiment.

Particularly, to avoid that the buffering liner plate 128 dropping into the receiving space 129 when the direct type backlight module 120 endures an impact and causes abnormal display of the display device 100, as shown in FIG. 2, a reflecting plate 226 of a direct type backlight module provided in another embodiment further includes a folded portion 227. The folded portion 227 extends from an edge of the stopping portion and fold back on the stopping portion 127. An included angle between the folded portion 227 and the stopping portion 127 is less than 90 degrees. For example, the included angle can be zero; however it is understood that the included angle is not limited to be zero. The buffering liner plate 128 is adjacent or adjoins to the folded portion 227 and the stopping portion 127, especially, adjacent or adjoins to a joining portion of the folded portion 127 and the stopping portion 127. The folded portion 227 above the stopping portion 127 increases the height of the reflecting plate 126 located on the extending portion 123b of the sidewall 123. Thus, the folded portion 227 efficiently prevents the buffering liner plate 128 from dropping into the receiving space 129 when the direct type backlight module 120 endures an impact and causes abnormal display of the display device 100. In addition, as shown in FIG. 3, the folded portion 227 is not limited to be folded only one time, and can be folded several times. Therefore, the buffering liner plate 128 can be adjacent or adjoin to the multiple-folded portion 227 and the stopping portion 127.

Figure 4:
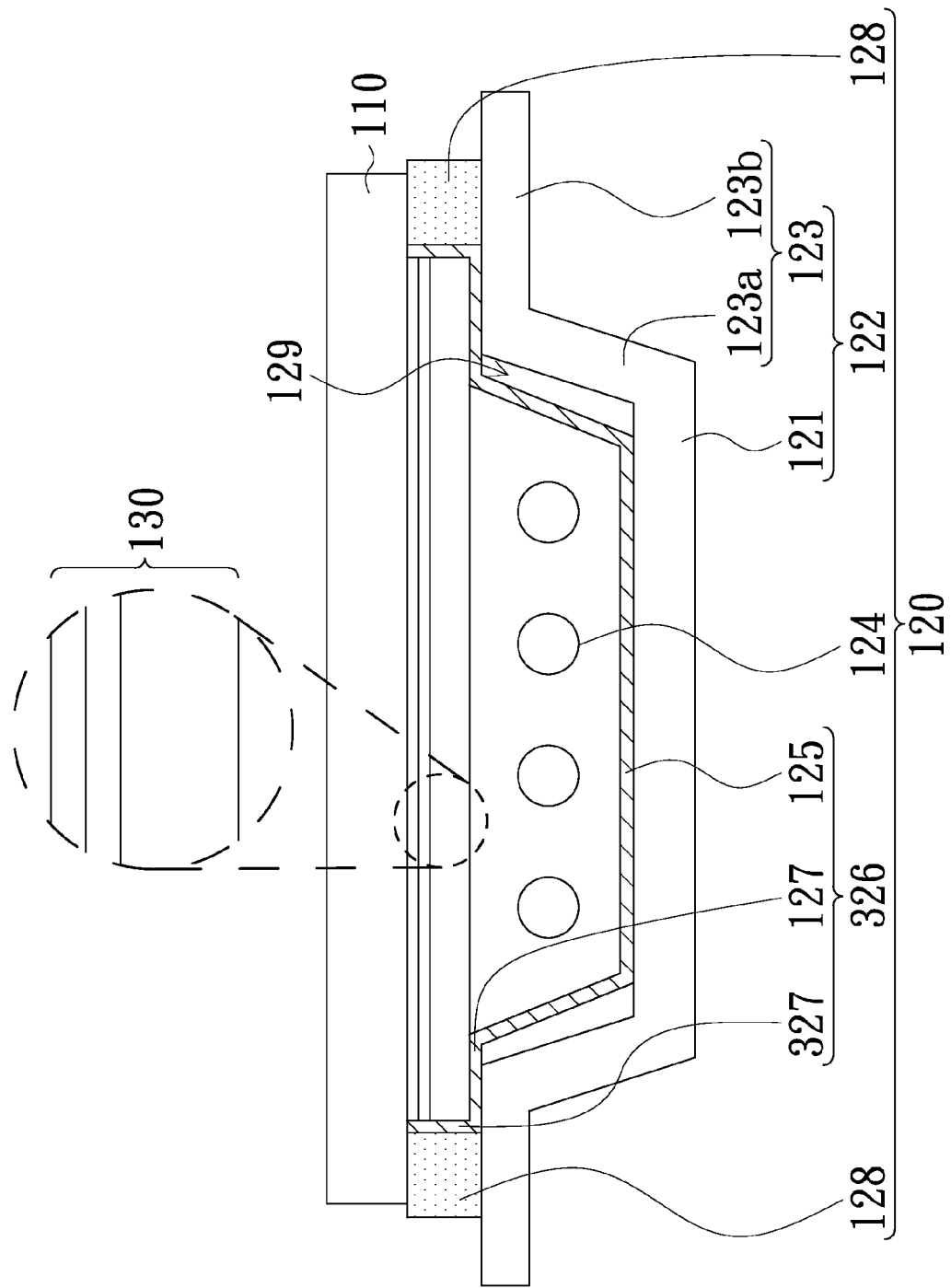
FIG. 4 is a cross sectional schematic view of a display device in accordance with a fourth embodiment.

Moreover, in another embodiment, as shown in FIG. 4, the reflecting plate 326 may include a number of bending portion 327. Each of the bending portions 327 extends upwardly from an edge of a corresponding stopping portion 127 and stands on the extending portion 123b. In the present embodiment, the bending portion 327, for example, is substantially perpendicular to the extending portion 123b of the sidewall 123, and is in surface contact with the buffering liner plate 128. However, the configuration of the bending portion is not limited as above described.

As shown in FIG. 4, the buffering liner plate 128 is adjacent or adjoins to the edge of the stopping portion 127 and the bending portion 327, and thus is accurately positioned onto the extending portion 123b. Furthermore, the stopping portion 127 and the bending portion 327 block between the buffering liner plate 128 and the receiving space 129 thereby prevent the buffering liner plate 128 from dropping into the receiving space 129 when endures an external impact.

Figure 5:
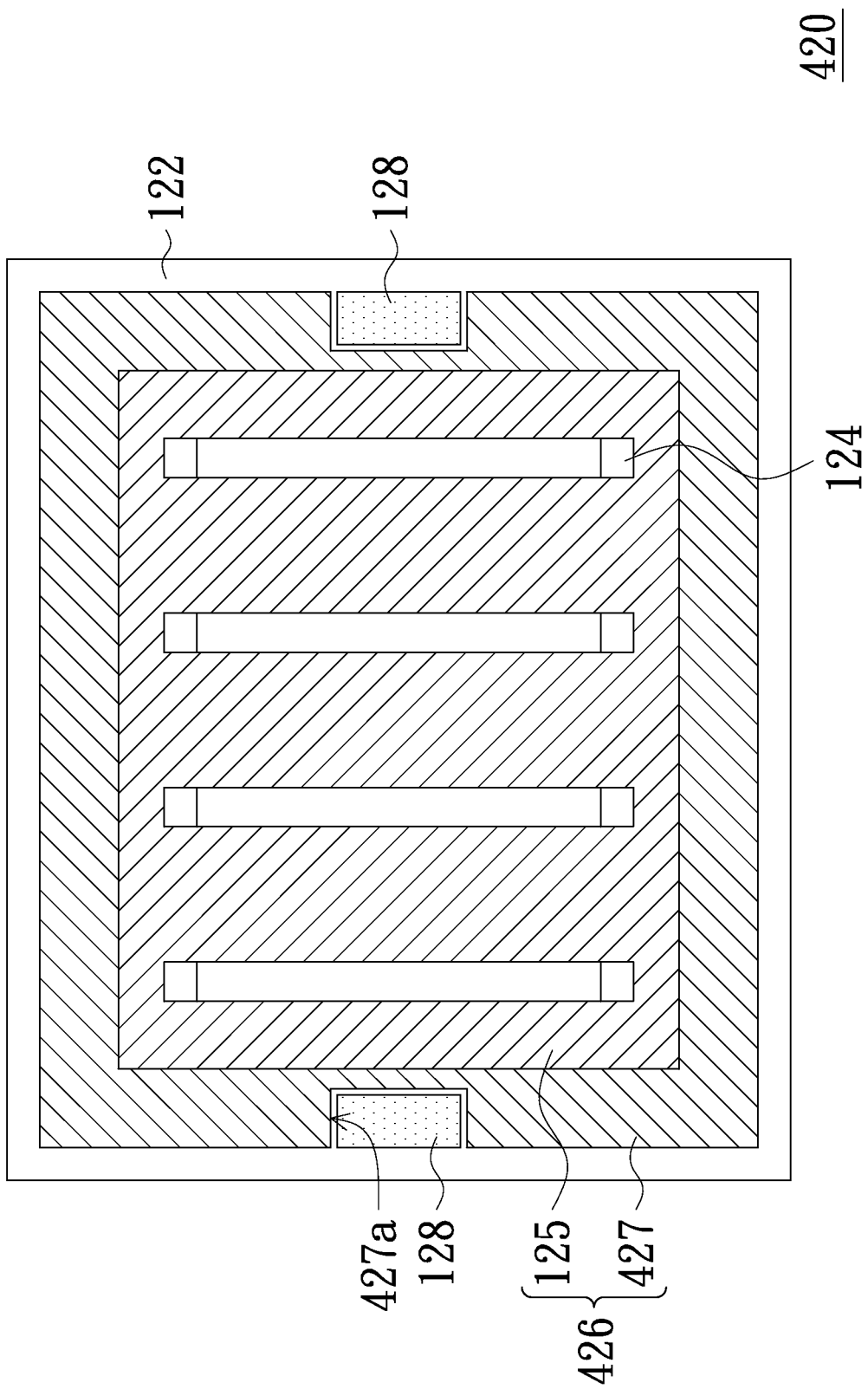
FIG. 5 is a top schematic view of a display device in accordance with a fifth embodiment.

FIG. 5 illustrates a top view of a direct type backlight module 420 in accordance with another embodiment. Referring to FIG. 5, to further utilize a stopping portion 427 of a reflecting plate 426 to accurately position the buffering liner plate 128 onto the extending portion 123b of the sidewall 123 of the bezel 122, the stopping portion 427 on the extending portion 123b, for example, includes a trench 427a, and the profile of the trench 427a is mated with the outer profile of the buffering liner plate 128. As a result, the buffering liner plate 128 can be disposed on the extending portion 126 and within the trench 427a to adjacent to the stopping portion 427.

Figure 6:
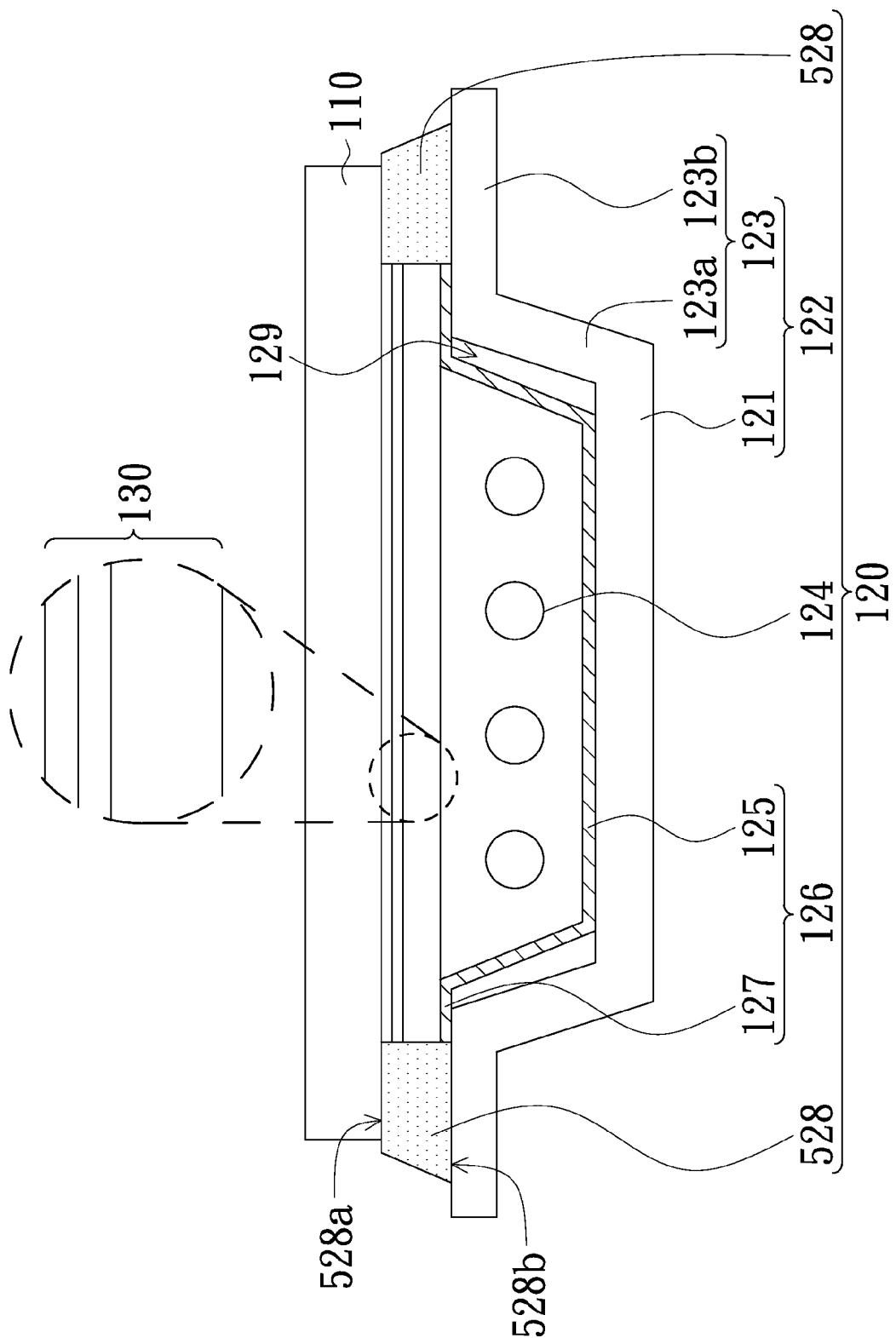
FIG. 6 is a cross sectional schematic view of a display device in accordance with a sixth embodiment.

It is to be noted that the outer profile of the buffering liner plate 128 is not limited to the rectangular shape as shown in aforementioned figures. In another embodiment, as shown in FIG. 6, the buffering liner plate 528 may also have a trapezoid-like cross-section. Specifically, the buffering liner plate 528 has a supporting surface 528a and a bottom surface 528b, wherein the bottom surface 528b contacts with the extending portion 123b of the sidewall 123 of the bezel 122, and the supporting surface 528a contacts with the display panel 110. An area of the bottom surface 528b is greater than that of the supporting surface 528a to increase the contact area between the buffering liner plate 128 and the extending portion 123b, so as to improve the stability when the buffering liner plate 128 is stuck onto the extending portion 123.

Figure 7:
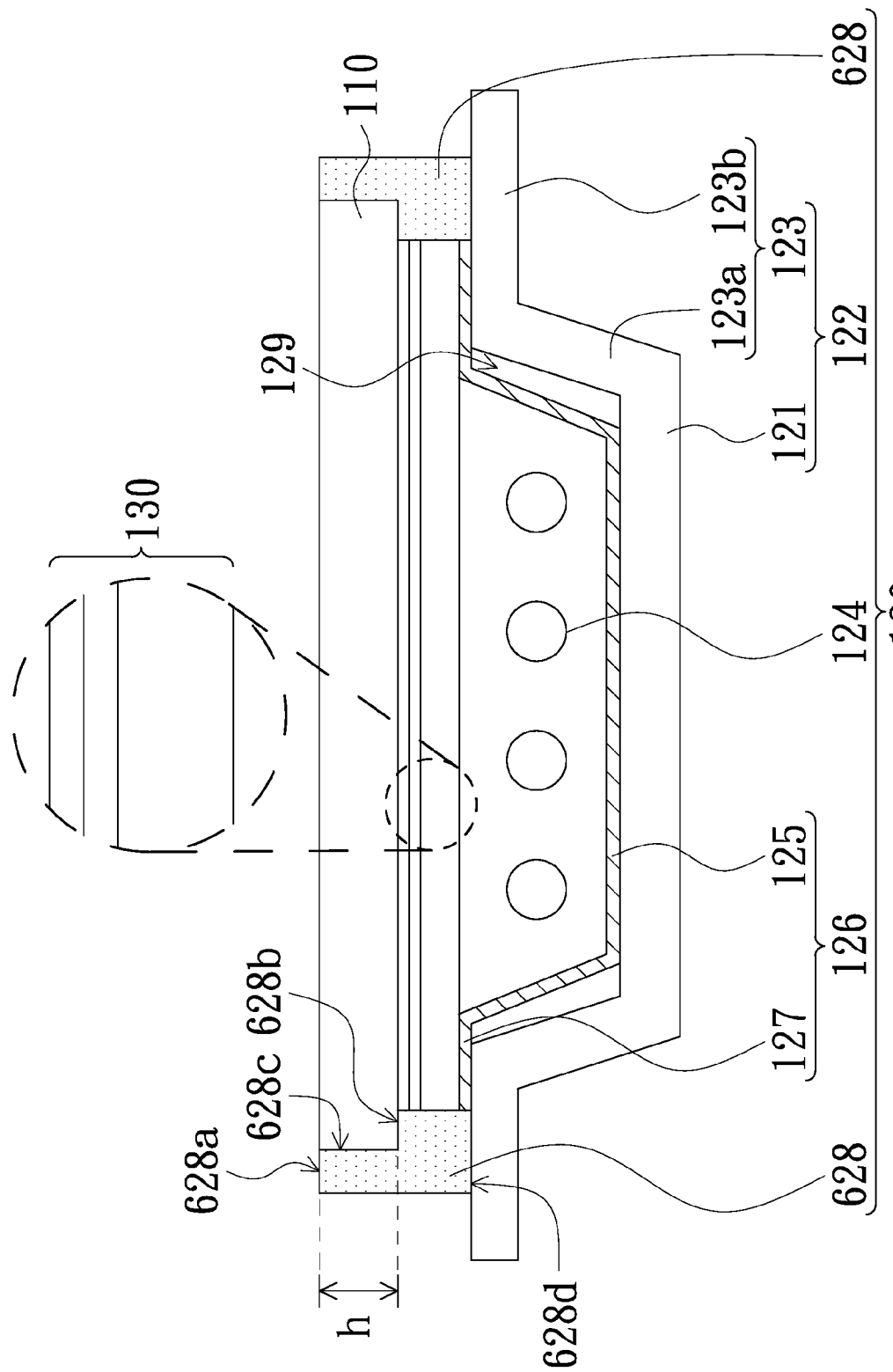
FIG. 7 is a cross sectional schematic view of a display device in accordance with a seventh embodiment.

In addition, as shown in FIG. 7, the buffering liner plate 628 can also has a top surface 628a, a supporting surface 628b, a stopping surface 628c, and a bottom surface 628d. The top surface 628a and the supporting surface 628b are substantially parallel to each other and opposite to the bottom surface 628d. The stopping surface 628c is connected between the top surface 628a and the supporting surface 628b. The supporting surface 628b and the top surface 628a has a height difference of h, and the supporting surface 628b is nearer to the reflecting plate 126 than the top surface 628a. The bottom surface 628d contacts with the extending portion 123b of the sidewall 123 of the bezel 122. The display panel 110 is supported by the supporting surface 628b and in tightly contact with the stopping surface 628c. Thus, in the present embodiment, the stopping surface 628c can prevent the movement of the display panel 110 in the horizontal direction (i.e., the direction parallel to the display panel 110), thereby avoiding unwanted displacement of the display panel 110 when endures an external force. In addition, the edge of the display panel 110 is also protected.

Although the reflecting plate and the buffering liner plate are described above with several different embodiments; however it is understood that these embodiments are not intended to limit the scope of the present invention. One of ordinarily skilled in the art would utilize the above embodiments in any modified form or combine different embodiments together, and these modifications or combinations should also be in the scope of the present invention.

In summary, the backlight module of the present invention utilizes the stopping portion of the reflecting plate to accurately position the buffering liner plate onto the bezel. As a result, the positioning precision of the display panel that is supported by the buffering liner plate is improved. Furthermore, the display quality of the display device using the direct type backlight module is also improved. In addition, the reflecting plate disclosed in above embodiments may also further includes folded portion or bending portion disposed within the receiving space surrounded by the buffering liner plate and the bezel. As such, the buffering liner plate is prevented from dropping into the receiving space when endures an outer impact. It is understood that if the buffering liner plate drops into the receiving space, the light emitted by the light source will be blocked by the buffering liner plate.

Moreover, in the direct type backlight module of the present disclosure, the buffering liner plate is directly disposed on the extending portion of the sidewall of the bezel, and the buffering liner plate is positioned by the stopping portion. Therefore, it is not necessary for any additional frame on the bezel. As a result, the volume of the direct type backlight module can be further reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A direct type backlight module, comprising:
   a bezel, comprising:
      a bottom plate; and
      a plurality of sidewalls, connected to the bottom plate thereby forming a receiving space, each of the sidewalls comprising a connecting portion and an extending portion, an end of the connecting portion being connected to the bottom plate, and the extending portion extending from another end of the connecting portion;
   a light source, disposed within the receiving space;
      a reflecting plate, disposed within the receiving space, the reflecting plate comprising a stopping portion and a reflecting potion, the reflecting portion being disposed between the light source and the bezel, each stopping portion extending outwardly from the reflecting portion and being fixed on the extending portion; and
      at least one buffering liner plate, disposed on at least one of the extending portion and directly contacted with an edge of the stopping portion; wherein the buffering liner plate is positioned by the stopping portion; and wherein the reflecting plate further comprises a plurality of folded portions, each of the folded portions extending outwardly from the edge of the stopping portion and being folded back on the stopping portion, the buffering liner plate directly contacted with the stopping portion and the folded portion.

2. The direct type backlight module of claim 1, wherein the reflecting plate further comprises a plurality of bending portions, each of the bending portions extending upwardly from the edge of the stopping portion to stand on the extending portion, the buffering liner plate directly contacted with the edge of the stopping portion and the bending portions.

3. The direct type backlight module of claim 1, wherein the stopping portion further comprises a trench and the buffering liner is disposed within the trench.

4. The direct type backlight module of claim 1, wherein the buffering liner plate comprises a top surface, a supporting surface, a stopping surface and a bottom surface;
   the top surface being substantially parallel to the supporting surface, the stopping surface being connected between the supporting surface and the top surface, the supporting surface and the top surface having a height difference relative to the bottom surface and the supporting surface is nearer to the reflecting plate than the top surface, the bottom surface contacting with a corresponding extending portion and is opposite to the top surface and the supporting surface.

5. The direct type backlight module of claim 1, wherein the buffering liner plate comprises a supporting surface and an opposite bottom surface, and an area of the bottom surface is greater than that of the supporting surface.

6. The direct type backlight module of claim 1, further comprising an optical film disposed above the receiving space.

7. A display device, comprising:
   a direct type backlight module, comprising:
      a bezel, comprising:
         a bottom plate; and
         a plurality of sidewalls, connected to the bottom plate thereby forming a receiving space, each of the sidewalls comprising a connecting portion and an extending portion, an end of the connecting portion being connected to the bottom plate, and the extending portion extending from another end of the connecting portion;
      a light source, disposed within the receiving space;
         a reflecting plate, disposed within the receiving space, the reflecting plate comprising a stopping portion and a reflecting potion, the reflecting portion being disposed between the light source and the bezel, each stopping portion extending outwardly from the reflecting portion and being fixed on the corresponding extending portion; and
         at least one buffering liner plate, disposed on at least one of the extending portion and directly contacted with an edge of the stopping portion;
      wherein the buffering liner plate is positioned by the stopping portion; and wherein the reflecting plate further comprises a plurality of bending portions, each of the bending portions extending upwardly from the edge of the stopping portion to stand on the extending portion, the buffering liner plate directly contacted with the edge of the stopping portion and the bending portions; and
   a display panel, spanning across over the receiving space and being supported by the buffering liner plate.

8. The display device of claim 7, wherein the reflecting plate further comprises a plurality of folded portions, each of the folded portions extending outwardly from the edge of the stopping portion and being folded back on the stopping portion, the buffering liner plate directly contacted with the stopping portion and the folded portion.

9. The display device of claim 7, wherein the stopping portion further comprises a trench and the buffering liner is disposed within the trench.

10. The display device of claim 7, wherein the buffering liner plate comprises a top surface, a supporting surface, a stopping surface and a bottom surface, the top surface being substantially parallel to the supporting surface, the stopping surface being connected between the supporting surface and the top surface, the supporting surface and the top surface having a height difference relative to the bottom surface and the supporting surface is nearer to the reflecting plate than the top surface, the bottom surface contacting with a corresponding extending portion and is opposite to the top surface and the supporting surface.

11. The display device of claim 7, wherein the buffering liner plate comprises a supporting surface and an opposite bottom surface, and an area of the bottom surface is greater than that of the supporting surface.

12. The display device of claim 7, further comprising an optical film disposed above the receiving space.

13. The direct type backlight module of claim 2, wherein each of the bending portions is perpendicular to the stopping portion.

14. The display device of claim 7, wherein each of the bending portions is perpendicular to the stopping portion.

* * * * *